(12) United States Patent
McCarthy et al.

(10) Patent No.: US 8,304,952 B2
(45) Date of Patent: Nov. 6, 2012

(54) ELECTRIC MOTOR WITH NO COUNTER ELECTROMOTIVE FORCE

(76) Inventors: Sean McCarthy, Dublin (IE); Seamus Flanagan, County Kildare (IE); Alan Simpson, Dublin (IE); Maxime Sorin, Dublin (IE)

( * ) Notice: Subject to any disclaimer, the term of this patent is extended or adjusted under 35 U.S.C. 154(b) by 91 days.

(21) Appl. No.: 12/967,741

(22) Filed: Dec. 14, 2010

(65) Prior Publication Data
US 2011/0227440 A1    Sep. 22, 2011

Related U.S. Application Data (60) Provisional application No. 61/286,056, filed on Dec. 14, 2009, provisional application No. 61/304,980, filed on Feb. 16, 2010.

(51) Int. Cl.
    *H02K 1/00*     (2006.01)
(52) U.S. Cl. ..................... 310/180; 310/156.01
(58) Field of Classification Search .......... 310/179–180, 310/156.01–156.84
See application file for complete search history.

(56) References Cited

U.S. PATENT DOCUMENTS

| | | | |
|---|---|---|---|
| 3,609,455 A * | 9/1971 | Salini et al. ...................... 361/23 |
| 5,177,416 A * | 1/1993 | Inaji et al. ................. 318/400.11 |
| 5,501,747 A | 3/1996 | Mastmeller et al. |
| 6,586,857 B2 * | 7/2003 | Hsu ........................... 310/156.05 |
| 8,044,548 B2 * | 10/2011 | Sakai et al. ............... 310/156.43 |
| 2003/0057799 A1 * | 3/2003 | Ohiwa et al. .................... 310/257 |
| 2006/0202583 A1 * | 9/2006 | Takeuchi ....................... 310/168 |
| 2009/0009157 A1 | 1/2009 | McCarthy et al. |
| 2009/0236923 A1 * | 9/2009 | Sakai et al. ............... 310/156.43 |
| 2010/0314961 A1 * | 12/2010 | An et al. ........................ 310/155 |

FOREIGN PATENT DOCUMENTS

| | | |
|---|---|---|
| EP | 1014541 A1 | 6/2000 |
| WO | 94/17582 A1 | 8/1994 |

\* cited by examiner

*Primary Examiner* — Thanh Lam
(74) *Attorney, Agent, or Firm* — Seyfarth Shaw LLP; Brian L. Michaelis (57) ABSTRACT

An electromagnetic motor system with no counter/back electromotive force due to the ability of the system to change from one magnetic state to another magnetic state in a defined sequence. In the first state a kinetic energy component is added to the system's rotor where two permanent magnetic materials, which are affixed to the rotor, are allowed to come into an angular range such that they act in a symmetrical manner on a fixed soft ferromagnetic material. This fixed soft ferromagnetic material also acts as the core of an electromagnetic coil and when the rotor's permanent magnets are at the closest proximity to the soft ferromagnetic core a voltage is applied across the coil, resulting in the soft ferromagnetic coil being saturated in a horizontal manner where previously it was polarized in a vertical manner while under the influence of the rotor's two permanent magnets.

5 Claims, 14 Drawing Sheets

ELECTRIC MOTOR WITH NO COUNTER ELECTROMOTIVE FORCE

FIELD OF THE INVENTION

The present invention is in the field of electric motors.

BACKGROUND OF THE INVENTION

Electric motors are well known in the art and are utilized in a wide range of applications ranging from home appliances to large scale industrial use to transport.

The electric motor has changed little since its inception in the sense that its operation is based upon magnetic interactions, namely the repulsive and attractive nature of magnetic interactions between magnetic bodies. It is the controlled interaction of these magnetic interactions which allows an electric motor to create a rotational motion which can in turn be translated into an increase in kinetic energy of the system's rotor.

What has changed is the materials science of the components of an electric motor. Known in the art are permanent magnets which exhibit ever increasing inherent magnetization levels. Insulation techniques for copper wire and other conductive materials allow for the function of an electric motor over a wide operational range. The development of soft ferromagnetic materials enables the use of materials which have a high permeability but low remanence values coupled with low coercivity characteristics and such materials exhibit a narrow and square hysteresis curve or loop.

The hysteresis loop shows the history dependent nature of a magnetization effect on a magnetic material. For example, if a suitable material, which has no magnetization levels, is saturated for the first time it will retain most or all of its magnetization once the external magnetic field used to achieve this saturation is removed. This is the fundamental difference between a permanent magnetic material and a soft ferromagnetic material in that once a soft ferromagnetic material is removed from its influencing magnetization field its magnetization will drop back to zero.

In the field of electromagnetic systems and research, advances have been made in component and equipment functionality, such as in power supplies, current measurement and differential probes, and materials choice for rotors and optical encoders or similar switching controllers. An important advance is the availability of low friction bearings, typically passive magnetic bearings, which provide for restraint of the spindle and allow its attached rotor to rotate about a defined axis at the lowest possible friction cost.

There are several aspects of classical physics which are relevant to this area of electric motors. Faraday's Law is one of the fundamental laws of electromagnetism. In essence the Law states that the electromotive force generated is proportional to the rate of change of magnetic flux.

Following on from Faraday's Law is Lenz's Law, which states that an induced current is always in such a direction as to oppose the motion or change causing it. This Law links electromagnetism to Newton's Third Law which states that for every action there is an equal but opposite reaction.

The implications of these Laws for electric motors are as follows: Counter electromotive force, or CEMF, is the electromotive force or voltage that will push against the applied current and is only caused by a changing magnetic field. Back electromotive force, or BEMF, is a more specific term to electric motors, and is an induced voltage that occurs where there is relative motion between the armature or rotor of the motor and the system's external magnetic field. CEMF or BEMF negatively affects the efficiency of electric motors known in the art.

SUMMARY OF THE INVENTION

The concept of the basic operation of an electric motor is very well understood in that an input in the form of electrical energy is converted into an output in the form of an increase in the kinetic energy of the system's rotor. This invention sets out a motor system that can achieve the same operation but without the associated counter/back electromotive force due to the motion of the rotor.

The invention disclosed herein relates to an electromagnetic motor system and more particularly an electric motor with no counter/back electromotive force (EMF) which is typically present due to the rotation of the system's rotor.

The invention disclosed herein relates to a motor system which has two defined states of a magnetic interaction which are switched in a defined sequence.

The system consists of a minimum of two permanent magnets of a high grade and magnetization level attached to the outer edge of the motor's rotor. The permanent magnets are positioned adjacent to each other such that their polarities are opposed i.e. North-South and South-North. Fixed with respect to the rotation of the rotor is an electromagnetic coil with a soft ferromagnetic core. The permanent magnets are positioned on the rotor so that they are symmetrically arranged with respect to the coil and soft ferromagnetic core in the direction of the system's axis. Their position is also such that as the system's rotor rotates they will both always be at the same angular displacement from the fixed coil and soft ferromagnetic core.

The soft ferromagnetic coil in this particular embodiment is of a ferrite material with a composition of Manganese and Zinc, though similar soft ferromagnetic materials such as those of a Nickel and Zinc composition may be utilized.

The first of the defined magnetic interaction sequences, called state one, takes place when there is no voltage applied across the electromagnetic coil.

In the second of the two interactions, initiated through the use of an optical disk and sensor set-up, a voltage of ample magnitude is applied across the coil to produce a sufficiently strong current to saturate the ferrite core of the electromagnetic coil. This is called state two of the system.

Switching takes place when the permanent magnets on the rotor are at their closest to the ferrite core.

During state one when there is no voltage applied across the coil and the rotor is free to rotate towards the fixed coil and its ferromagnetic core, a torque will act on the rotor to cause it to move towards an angular position so that the permanent magnets and soft ferromagnetic core reach their closest point.

Torque exists on the system's rotor due to the fact that the soft ferromagnetic core will be polarized by the fields of the permanent magnets on the rotor in a direction vertical to the plane of the rotor. This polarization of the soft ferrite core will cause a force of attraction to exist between the permanent magnets on the system's rotor and the soft ferromagnetic core. The polarization of the ferrite is such that a south pole is created to oppose the presented north pole of one of the permanent magnets, and the south pole of the other permanent magnet will create a north pole. The areas of magnetization on the ferrite will be substantially equal and opposite due to the symmetric nature of the position of the ferrite core relative to the two permanent magnets. This torque, combined with the angular displacement that it causes will increase the kinetic energy of the system's rotor.

When the permanent magnets are at their closest point to the soft ferromagnetic core, stage two is initiated by a voltage being applied across the coil of sufficient magnitude to cause the ferromagnetic core to become magnetically saturated. Magnetic saturation and hence the voltage applied to effect same, is a function of the soft ferromagnetic core material, that is to say that the current supplied is directly dictated by the current required to saturate the ferrite core in this instance in a manner that the ferrite core is polarized horizontally. The force of attraction that existed between the soft ferromagnetic core and the permanent magnets will now be substantially reduced due to the fact that in its saturated state the ferromagnetic core will be magnetically polarized horizontally.

There will be no net force (and hence torque) between the stationary coil and the permanent magnets because the force that exists between the coil and each permanent magnet will be of an equal magnitude but opposite direction. The torque acting between the soft ferromagnetic core and the permanent magnets on the system's rotor, combined with the angular displacement will cause the system's rotor to lose kinetic energy.

Due to the net magnetization vectors of the soft ferromagnetic core in its saturated magnetization of state two being lower than in state one, there is a lower net torque acting on the rotor. However since angular displacement in both states is the same, the overall result of the sequenced action of both states of the interaction will be an increase in the kinetic energy of the system's rotor.

Due to the symmetry of the permanent magnetic arrangement on the system's rotor with respect to the fixed coil, there is no net rate of change of flux through the coil during the motion of the system's rotor, and hence no induced electromotive force to act against the voltage applied across the coil (i.e. no counter or back EMF).

During normal operation the system will change from state one to state two when the permanent magnets are closest to the fixed soft ferromagnetic core and back to state one when the rotor's permanent magnets are furthest away from the fixed soft ferromagnetic core.

The reversal of the current direction has no meaningful change on the angular displacement direction of the rotor as it moves through state one and state two. That is to say that changing the current will not have any significant change to the kinetic energy of the rotor as a positive torque component will continue to be added to the system by the symmetric attractive forces between the permanent magnets and the ferrite core. When the current is reversed the ferrite will again be saturated and polarized horizontally but with the polarity reversed. Again there is no net rate of change of flux through the coil during the motion of the system's rotor, and hence no induced electromotive force to act against the voltage applied across the coil.

The current supply direction will dictate the angular displacement direction of the systems rotor. When the current is reversed the pulse motor will act like a magnetic brake.

DETAILED DESCRIPTION OF THE INVENTION

In accordance with one embodiment of the present invention illustrated in FIGS. 1-6, two permanent magnets 3 are mounted on a polycarbonate rotor 2. The polycarbonate disk has a diameter of 99.5 mm and a height of 11.6 mm with a cavity in the center of diameter 12.1 mm for an adapter bushing of a brass material, which couples the rotor 2 to the spindle 1. The adaptor bushing has a diameter of 12 mm and is designed to restrain or couple the polycarbonate disk 2 to the spindle 1.

The spindle is made of a stainless steel material and has a diameter of 6.25 mm and a total length of 200 mm. It is restrained in its rotational axis by a pair of passive magnetic bearings 7 which provide axial and radial rigidity while offering exceptionally low friction characteristics. Each of the passive magnetic bearings has two axially magnetized rings, which each exhibit at least one pair of north and south poles. The magnetized rings are positioned in a manner where the poles are in a repulsive magnetic interaction such that the plane of symmetry which separates the like poles lies perpendicular to the axis of the rotation of a shaft and this radially constrains the movement of the shaft. Axial rigidity is added to the system by the use of ceramic bearings and related axial retaining mechanisms, as known in the art, on one of the ring magnets thus maintaining the magnetic bearing in an otherwise unstable axial plane.

Figure 1A:
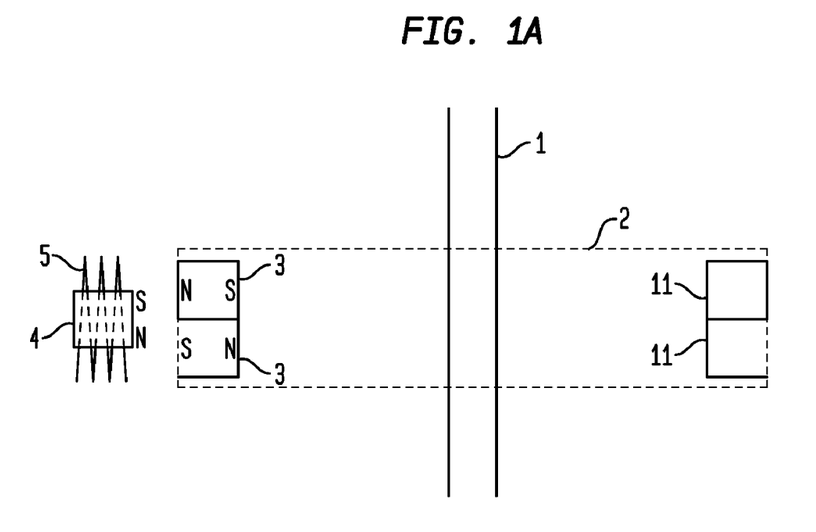
FIG. 1A is a side view of the position of the magnetically reactive bodies with respect to each other.
Figure 1B:
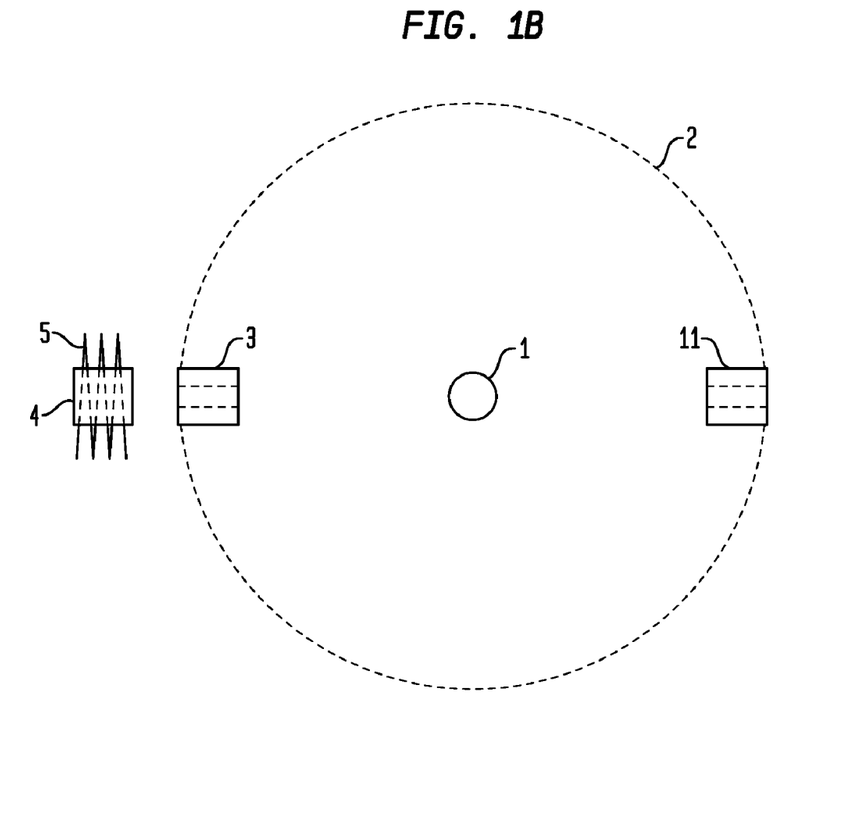
FIG. 1B is a top view of the position of the magnetically reactive bodies with respect to each other.

The permanent magnets 3 are of a N35H grade and cylindrical in shape with length and diameter of 10 mm. The system consists of two permanent magnets 3 attached to the rotor 2 of the motor with opposite magnetic polarities as shown in FIG. 1. The permanent magnets are positioned on the rotor 2 so that they are symmetrically arranged with respect to the system's coil 5 and its soft ferromagnetic core 4 in the direction of the system's axis. That is, the permanent magnets exist on the x-plane with the shaft being positioned in the y-plane, as per the x, y plane identifier 14 in FIG. 5. A counterbalance 11 of brass material, of the same weight (11.8 g) as the two permanent magnets 3, is added to the system's rotor approximately 180 degrees away from the permanent magnets, again positioned in the symmetric manner as the permanent magnets 3 with respect to the direction of the system's axis.

The soft ferromagnetic core 4 is a sintered ferrite with a composition of Manganese and Zinc from Magnet Sales of Swindon, United Kingdom, part number RDSF01556. It is of length 9.45 mm and it is cut down to 8.7 mm to sit substantially within the electromagnetic coil's 5 core.

The electromagnetic coil 5 is wound with insulated and bonded copper wire of 25 American Wire Gauge (AWG), with a core diameter of 9.6 mm and a total of 360 turns.

Figure 6:
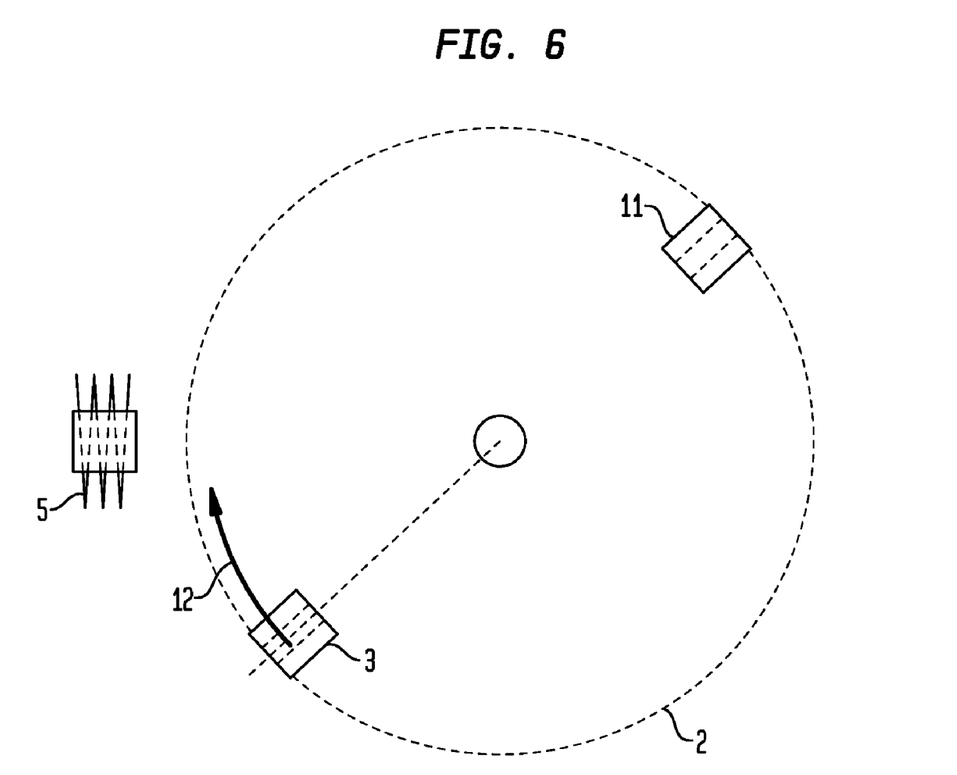
FIG. 6 shows the direction of the angular displacement of the rotor.

In FIG. 6 the direction of the angular displacement 12 is shown. As the system's rotor 2 travels on this angular displacement it will come into an angular range where the magnetic field of both permanent magnets 3 can act on the ferrite core 4. The permanent magnets are positioned on the rotor so that they are symmetrically arranged with respect to the system's coil and soft ferromagnetic core and as such they will act on the core in a manner that results in an attractive force or torque acting on the rotor. In turn the permanent magnets will magnetize the core in a manner that the two forces acting on the bodies are substantially equal but opposite.

Figure 2:
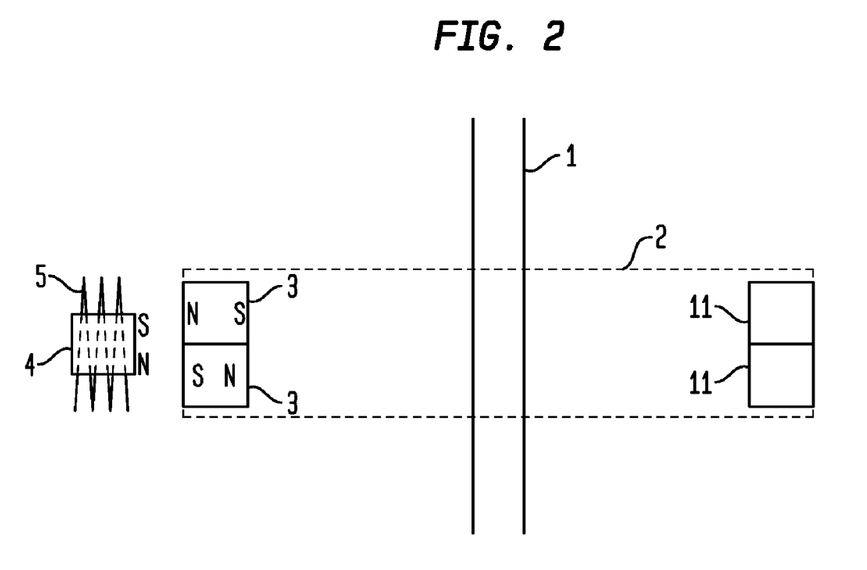
FIG. 2 is a side view of the polarity of the permanent magnets and the ferrite core at the position of closest proximity before a current is applied across the coil.
Figure 3:
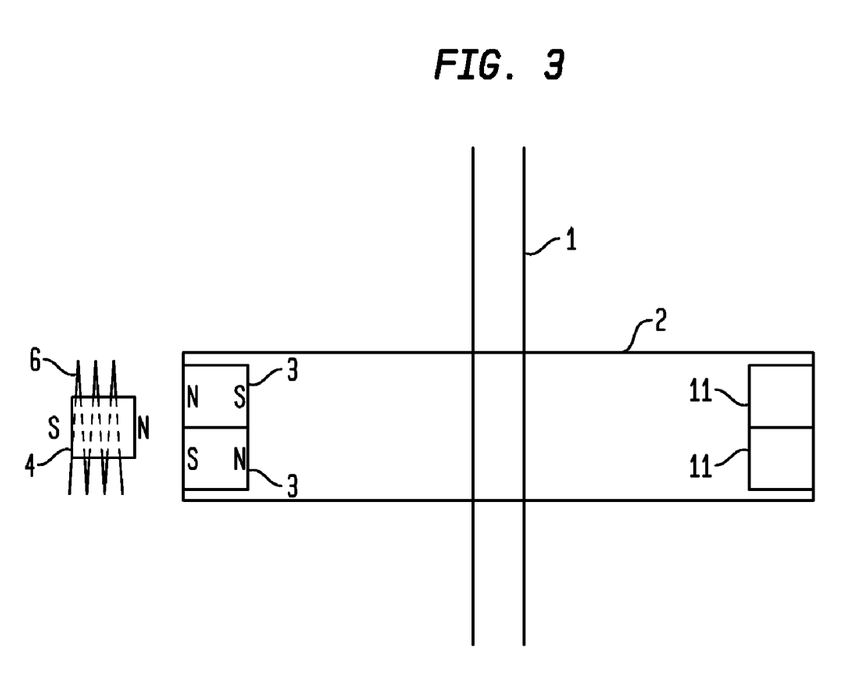
FIG. 3 is a side view of the polarity of the permanent magnets and the ferrite core at the position of closest proximity when a current is applied across the coil.

FIG. 2 illustrates the magnetization effect the permanent magnets 3 will have when they have been allowed to rotate about an angular path so that they are as close as possible to the ferrite core 4. From FIG. 2 it can be seen that the ferrite will become magnetized in a manner that there are two opposite polarity magnetized regions vertically with respect to the rotor so that the presented north pole of the permanent magnet will create an opposite south pole on the ferrite and conversely the presented south pole of the other permanent magnet will create a north pole on the ferrite core.

Figure 4:
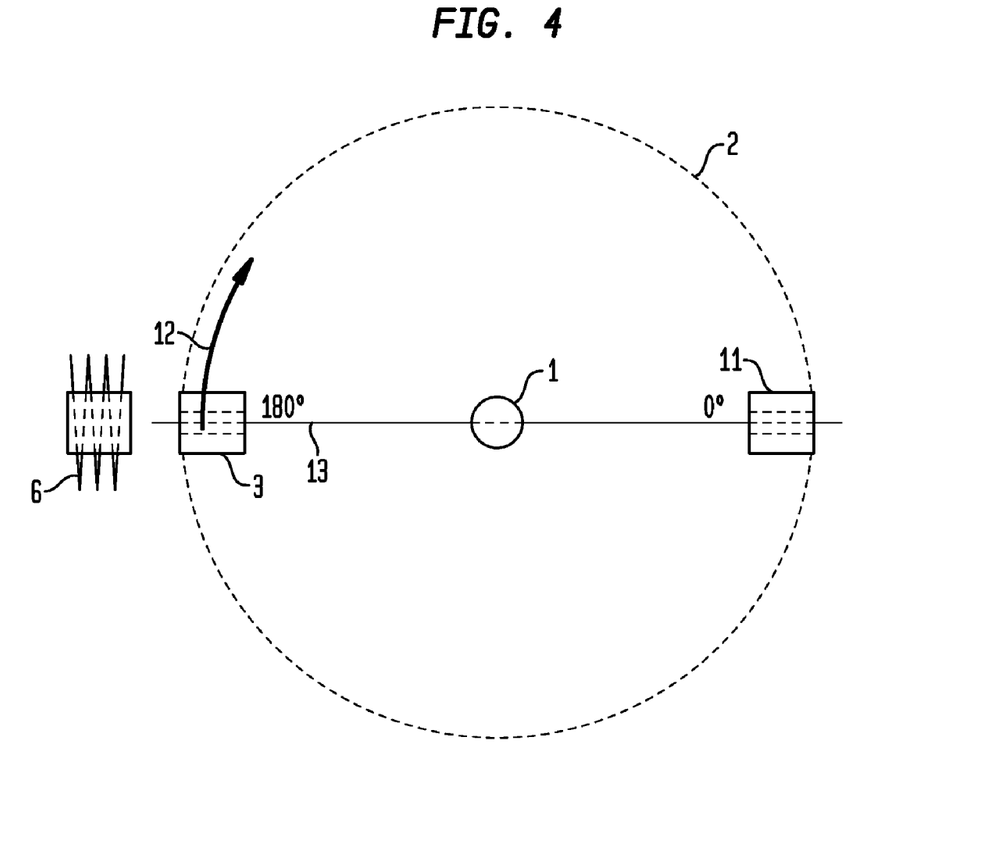
FIG. 4 is a top view of the switching point: 180 Degree, from State One to State Two.

In FIG. 4 the electromagnetic coil 6, with its ferrite core 4, has a voltage applied to it such that the current across the coil is approximately 4 Amps and this is of sufficient magnitude to cause the soft ferromagnetic core 4 to become magnetically saturated. This firing angle, that is the angular position at which the voltage is applied across the coil, is represented in FIG. 4 as the 180 degree mark 13. The application of the voltage is switched by an optical reader 9, in this instance a Sunx 4EPK, having being activated by an optical disk 10 which has a diameter of 28 mm and is coupled to the spindle. The optical disk and its reader presents a square wave signal to the system which results in an open and closed signal being relayed to a solid state relay 8 depending on whether the reader is seeing the opaque or clear section of the disk. The disk is configured so that the current is only allowed to flow when the system is in State Two and no current flows when the system is in State One. The solid state relay is from Croydom, model SSC 1000-25-24 and is rated for a maximum output of 25 Amps based on a 24 volt feed.

The voltage feed is supplied by an ISO Tech IPS-2303, Laboratory DC Power Supply. As per FIG. 4 the electromagnetic coil 5 does not have a voltage applied to it from 0 degrees to 179 degrees and the electromagnetic coil 6 has a voltage applied to it from 180 degree to 360 degrees. This is achieved by the optical disk having an open circuit setting from 0 to 179 degrees and conversely controlling a closed circuit, with the solid state relay and an applied voltage from 180 degrees to 360 degrees.

Figure 5:
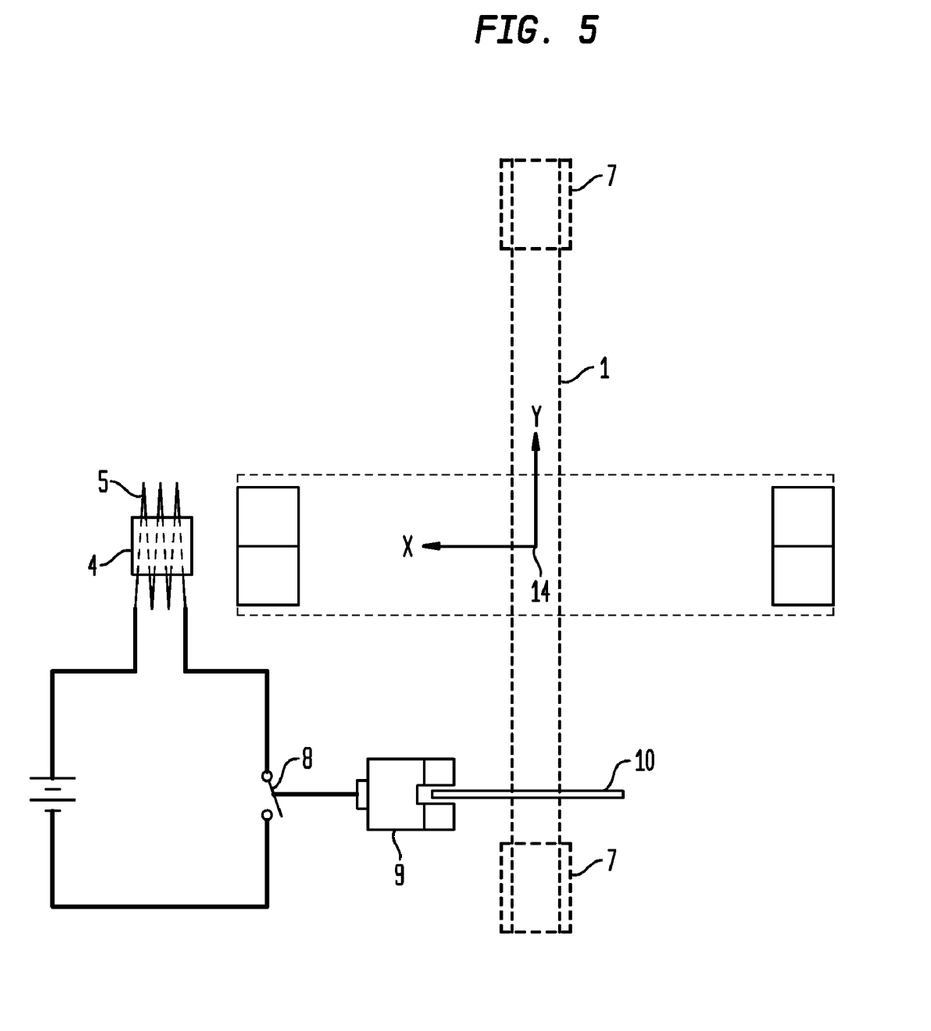
FIG. 5 is a complete system component schematic.

In this embodiment FIG. 5 presents all of the system's components and in turn the positional relationship to one another at a particular angle, in this instance the 0 degree mark as set out in FIG. 4.

Figure 7:
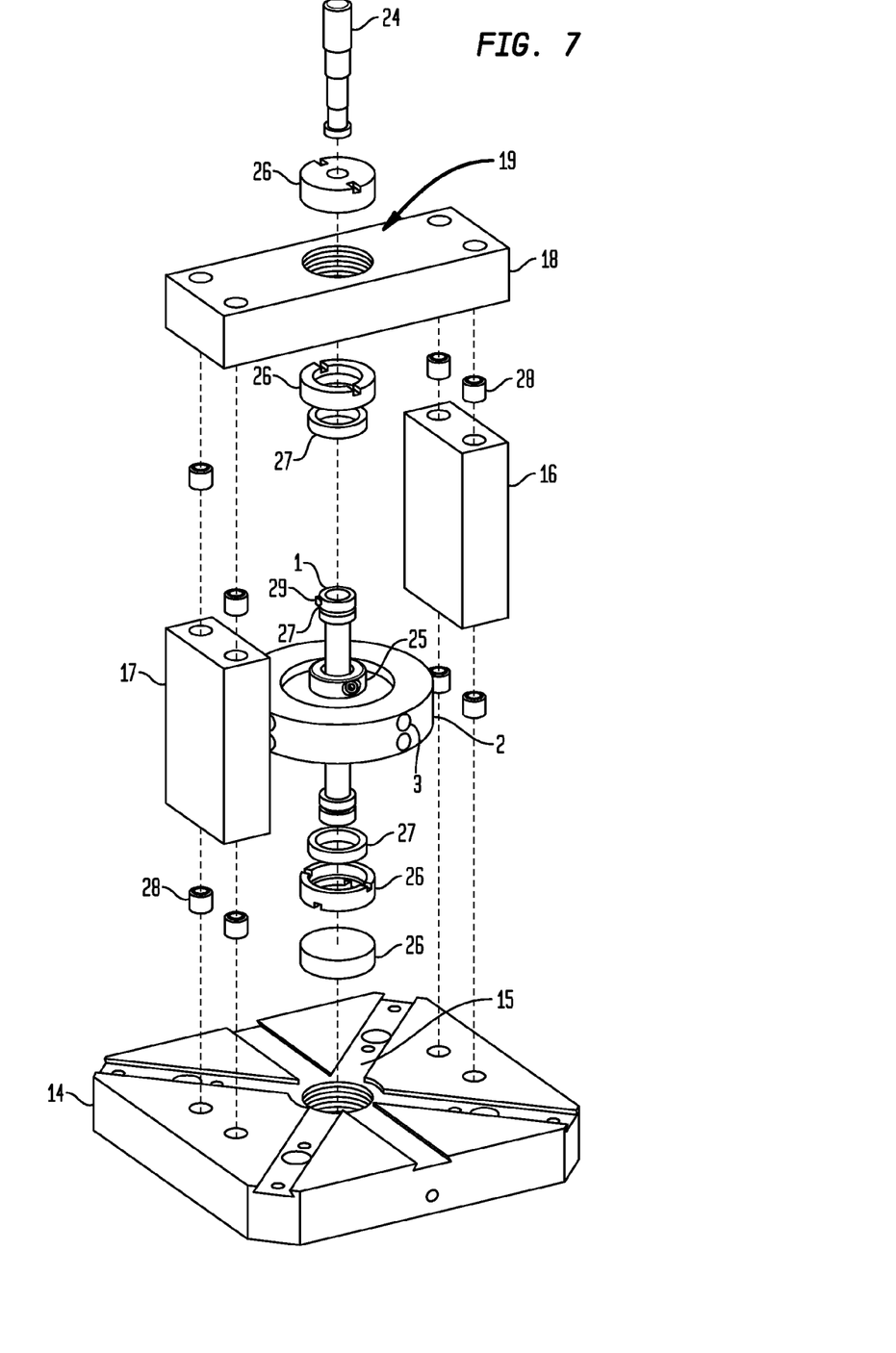
FIG. 7 shows an exploded view of an embodiment of the electric motor assembly.
Figure 8A:
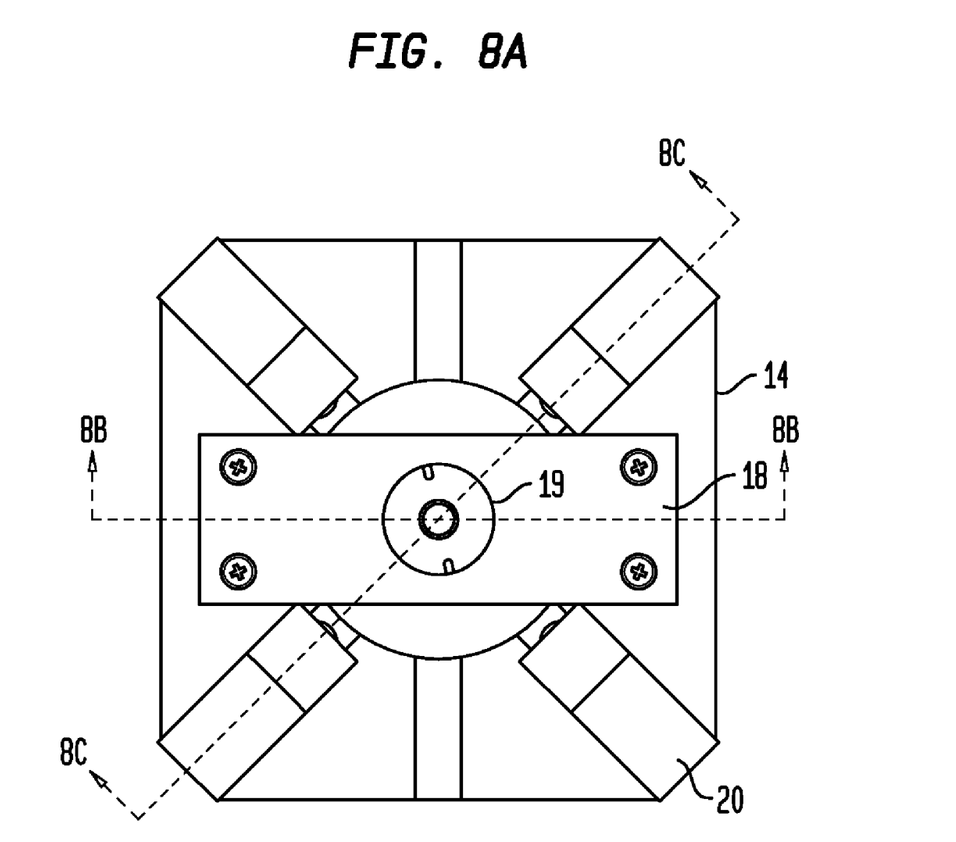
FIG. 8a shows a top view of an embodiment of the electric motor.
Figure 8B:
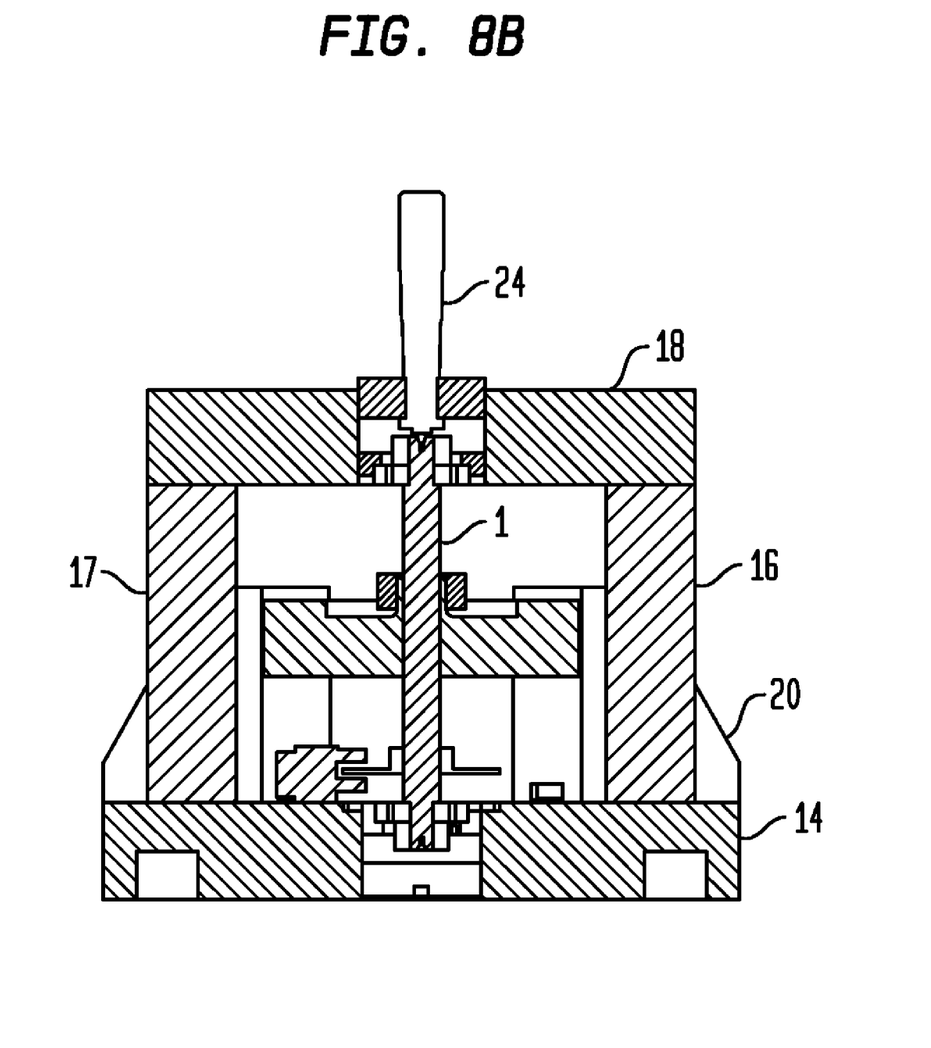
FIG. 8b shows a sectional view through plane A-A of an embodiment of the electric motor.
Figure 8C:
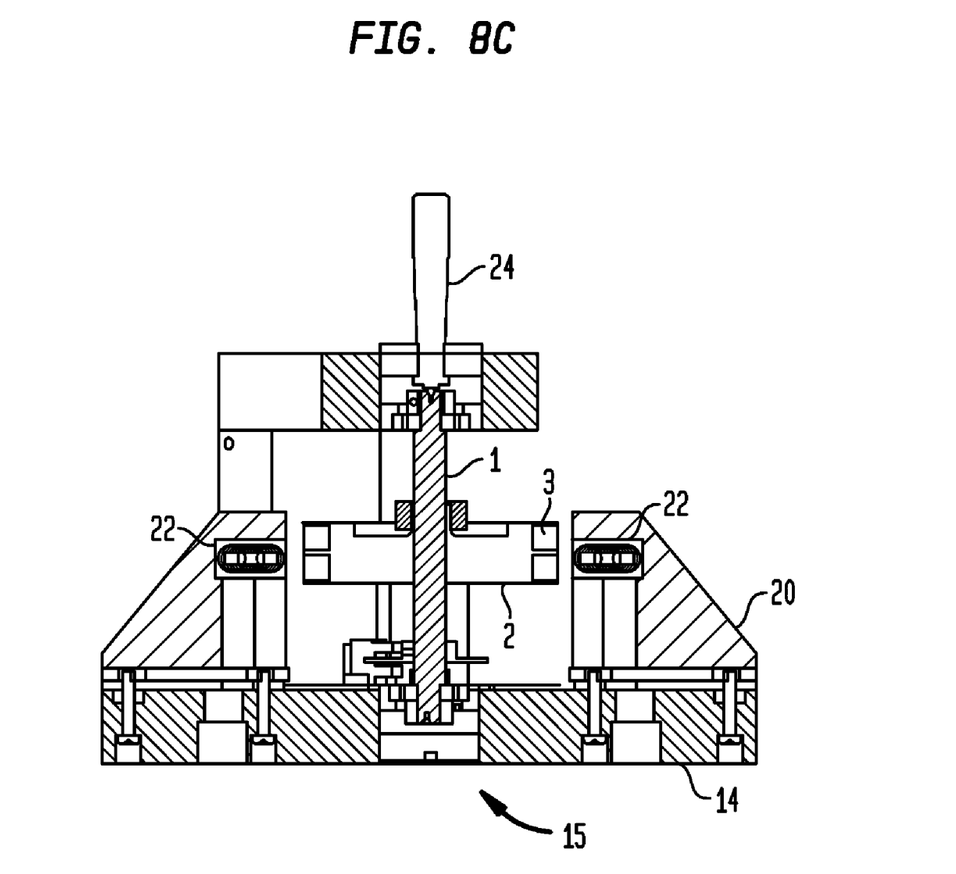
FIG. 8c shows a sectional view through plane B-B of an embodiment of the electric motor.
Figure 8D:
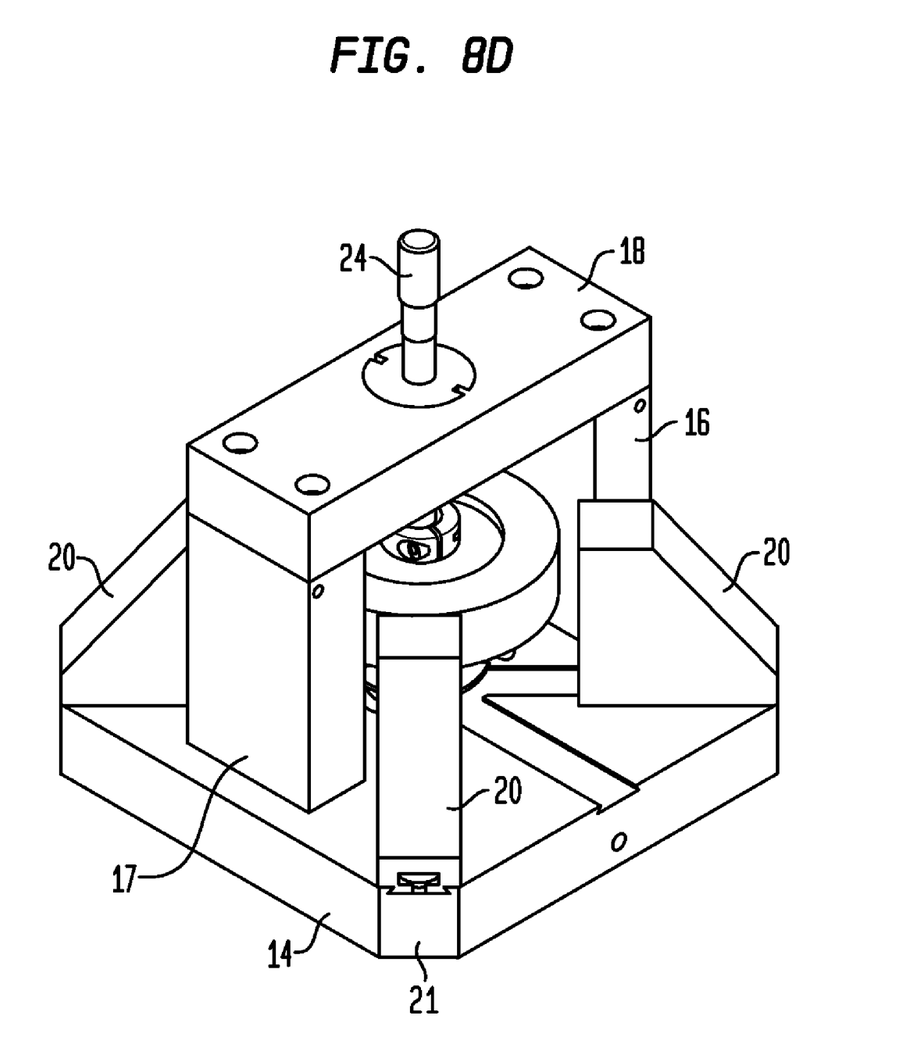
FIG. 8d shows a perspective view of an embodiment of the electric motor.

Shown in FIG. 7, a further illustrative embodiment comprises a polycarbonate base 14, 200×200 mm in size, of height 30 mm with 20×20 mm bevelled corners. A number of cut outs and mounts are provided to facilitate assembly, the most notable being a 39 mm diameter hole 15 provided in the centre of the base 14. Two polycarbonate stands 16, 17, both 100 mm tall, 60 mm wide and 28 mm deep are mounted on the base 14 and another polycarbonate bracket 18 is mounted across the top of stands 16 and 17. Bracket 18 is 172 mm long, 60 mm wide and 30 mm deep, with a 39 mm diameter hole 19 in its centre, positioned such that it is aligned with the hole 15 in the main base 14.

The spindle 1 is mounted and positioned through the 39 mm holes 15, 19 in the base 14 and the bracket 18, respectively, utilizing similar low-friction magnetic bearings 7 as described earlier. Additional components include a micrometer head 24 attached to the spindle 1, collars 25, nuts 26, ring magnets 27, bushings 28, and clamp collar 29. In one embodiment the micrometer head 24 is made of stainless steel; the collars 25, nuts 26, bushings 28, and clamp collar 29 are acetal. A tungsten-carbide ball 30 rests atop the spindle 1.

As shown in FIGS. 8a-8d, four additional polycarbonate brackets 20 are mounted on the base 14. These brackets 20 are broadly triangular in shape with squared-off edges, 70 mm tall, 71 mm wide and 30 mm deep. Each of these brackets 20 is provided with a cut-out 21 at 41.5 mm from its base, said cut-out being 15 mm tall, 27 mm wide and 27 mm deep. The brackets 20 are each mounted on the diagonals of the base 14 such that the cut-out 21 is facing towards the centre of the base 14. Positioned within the cut-outs 21 of the polycarbonate brackets 20 are four toroidal coils 22. These coils 22 are comprised of a Magnetec M-059 torus core, with a 120-turn winding utilizing American Wire Gauge 27 copper wire.

Figure 9:
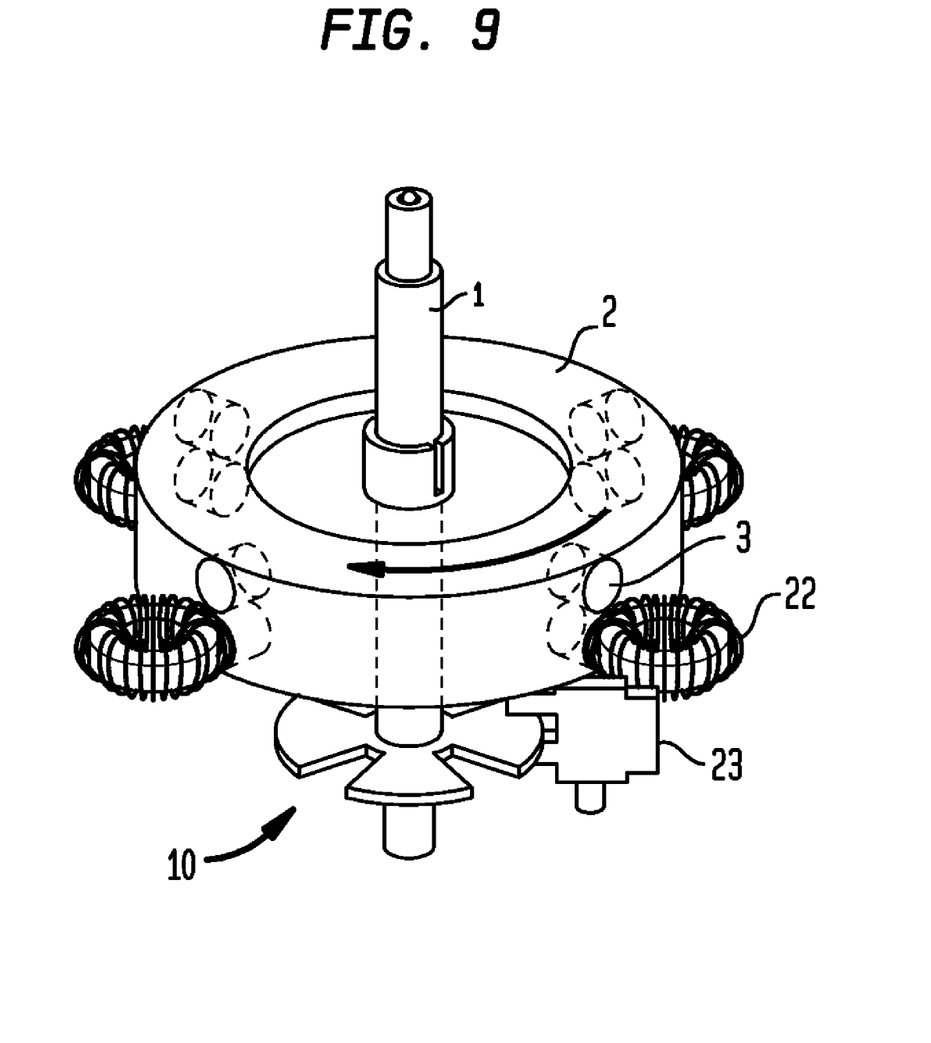
FIG. 9 shows a partial perspective view of the spindle, rotor, magnets, coils, optical disk and optical switch as in one embodiment of the invention.

As shown in FIG. 9, a spindle 1 has attached to it several components of the embodiment. The spindle 1 is of a rigid epoxy material and is 130 mm in length, with a diameter of 12 mm over the central 100 mm, and diameter of 8.1 mm for 15 mm at either end. Also attached to the spindle is an optical disk 10. This optical disk 10, in conjunction with similar control equipment to that described earlier including an optical switch 23, relay (not shown), and power supply (not shown) provides for four instances per revolution where the toroidal coils 22 are supplied with current. Current is supplied to the coils 22 when each of the pairs of magnets 3 mounted on the rotor 2 is exactly aligned with one of the coils 22 and then switched off until the next instance when the magnet pairs 3 and the coils 22 are aligned. The current is supplied over 25 degrees of revolution for each alignment.

The rotor 2 is of polycarbonate and is 100 mm diameter and 24 mm tall. At each of the four principal cardinal points it is provided with a pair of cut-outs on its vertical exterior side, each of these being 10.1 mm in diameter, 10 mm deep. These cut-outs hold pairs of permanent magnets 3 for a total of 8 magnets. In this embodiment the magnets 3 are 10×10 mm cylindrically shaped, of type NdFeb N38H. The magnets 3 are mounted one above the other. In this illustrative embodiment the upper magnet 3 of each pair is mounted with its North pole facing outwards and the lower magnet 3 of each pair is mounted with its South pole facing outward. The air gap between the magnet pairs 3 and the toroidal coils 22 is 10 mm in this embodiment, although that can be adjusted by moving the brackets 20.

Figure 10:
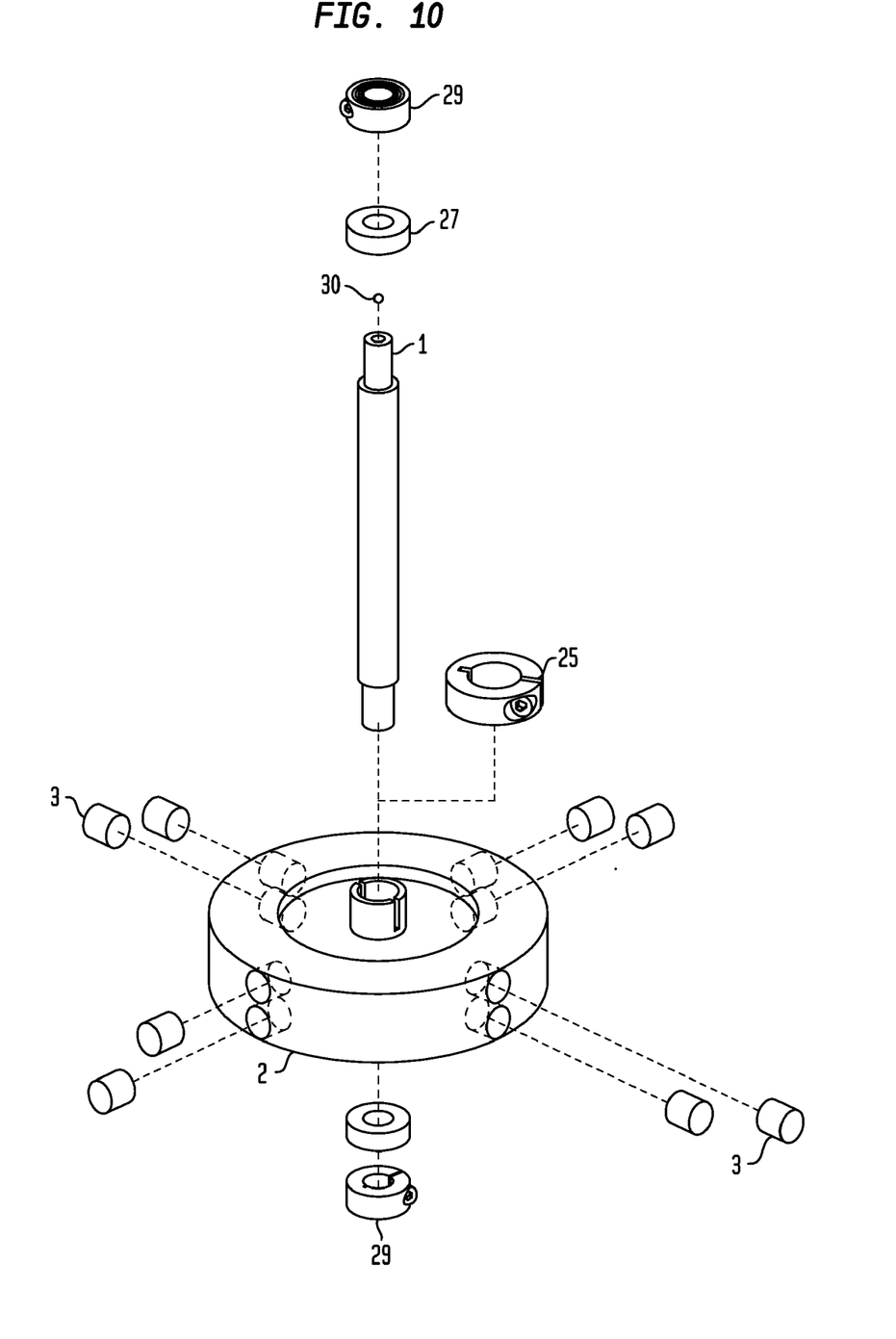
FIG. 10 shows a exploded view of an embodiment of the invention with the spindle, rotor, magnets, and selected accompanying components.
Figure 11:
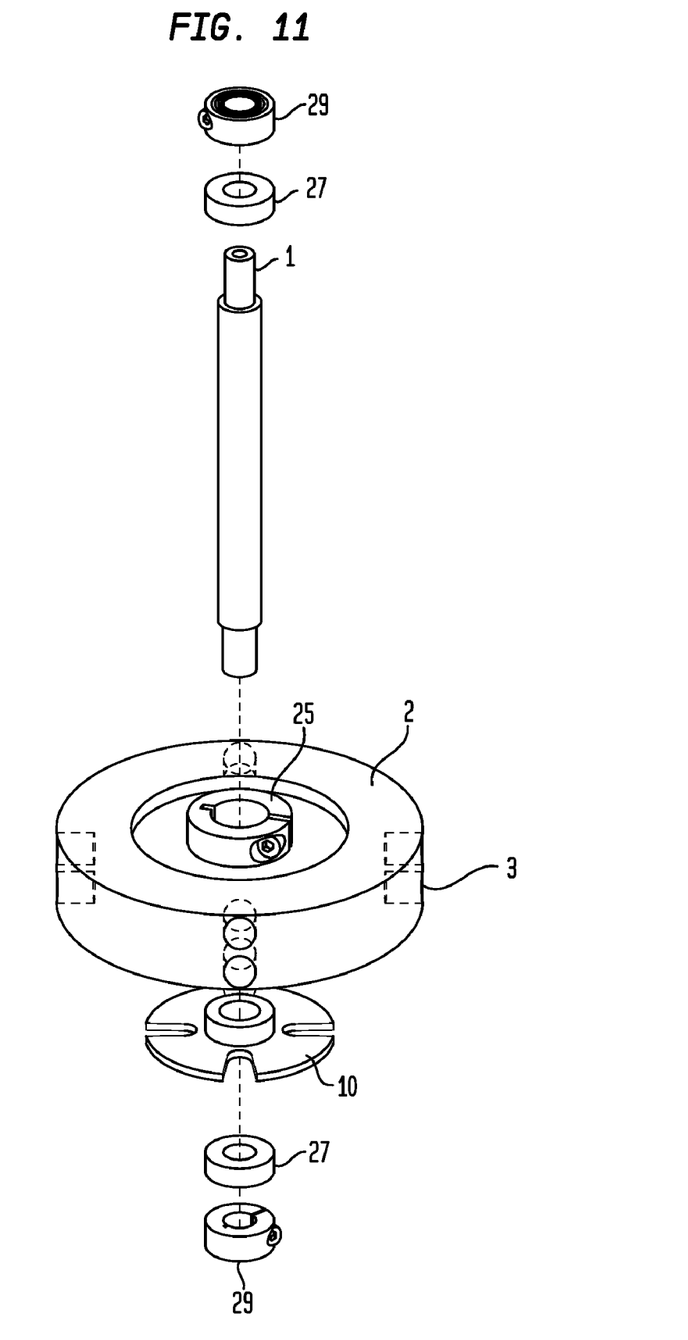
FIG. 11 shows an assembly view of an embodiment of the invention with the spindle and selected accompanying components.
Figure 12:
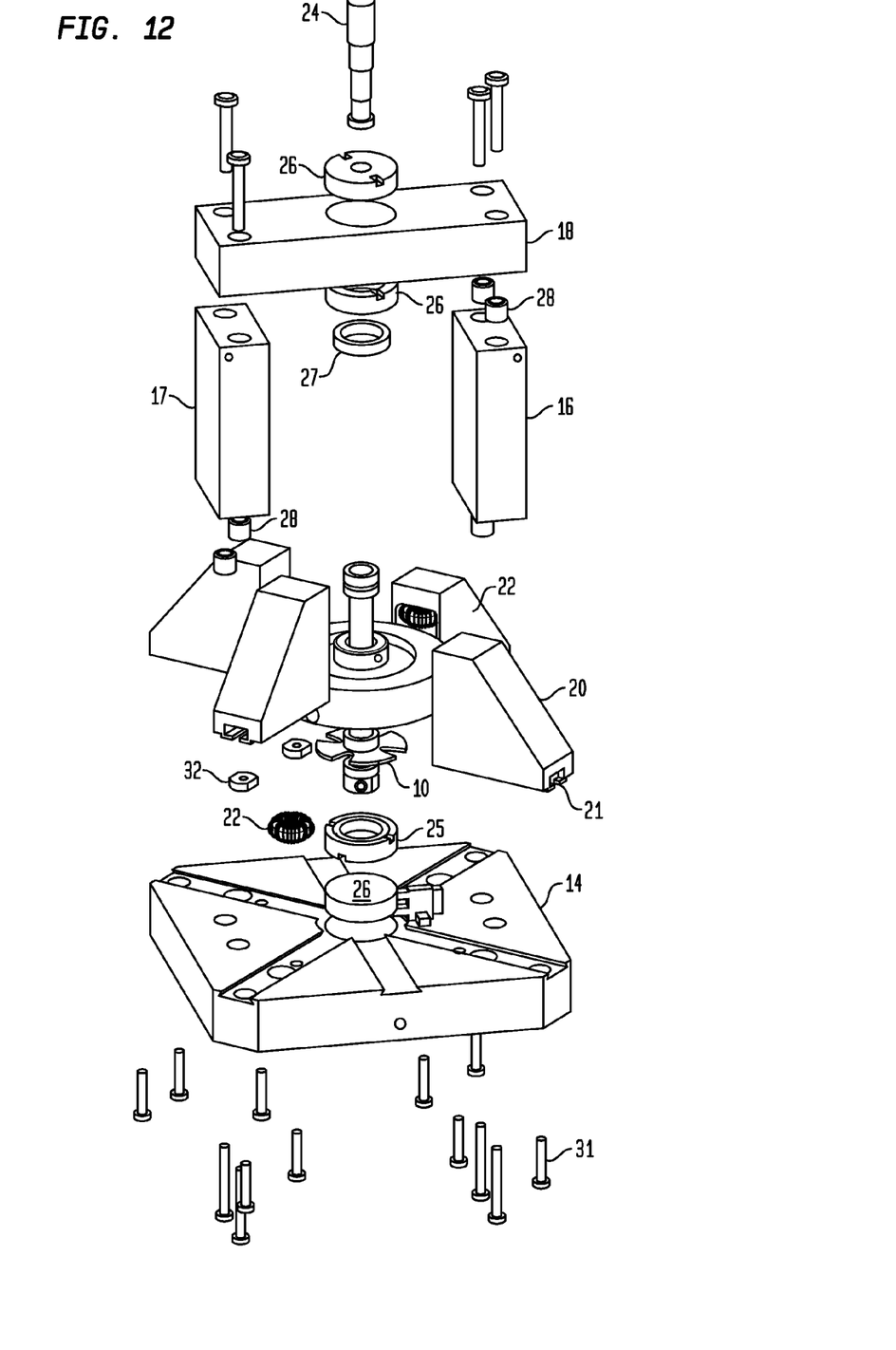
FIG. 12 shows an assembly schematic of an embodiment of the invention.

FIGS. 10-12 show alternate views of an illustrative embodiment with the above-mentioned components. As shown in FIG. 12, the base 14, bracket 18, and stands 16, 17 may be assembled using machine screws 31 and machine nuts 32 as shown, or by using other appropriate fasteners, an adhesive, or solvent welding.

While the invention has been described with reference to illustrative embodiments, it will be understood by those skilled in the art that various other changes, omissions, and/or additions may be made and substantial equivalents may be substituted for elements thereof with departing from the spirit and scope of the invention. In addition, many modifications may be made to adapt a particular situation or material to the teaching of the invention without departing from the scope thereof. Therefore, it is intended that the invention not be limited to the particular embodiment disclosed for carrying out this invention, but that the invention will include all embodiments, falling within the scope of the appended claims.

What is claimed is:

1. An electric motor system, comprising:
  a rotor;
  a spindle to which the rotor is attached;
  at least two permanent magnets attached to an outer edge of the rotor, the at least two permanent magnets positioned adjacent to each other such that their polarities are opposed;
  an electromagnetic coil with a soft ferromagnetic core, the electromagnetic coil disposed proximate to the rotor in a manner so that the at least two permanent magnets are positioned on the rotor symmetrically arranged with respect to the electromagnetic coil and soft ferromagnetic core and allowed to rotate about an axis which is determined by the spindle to which the rotor is attached, the electromagnetic coil with soft ferromagnetic core positioned such that as the rotor rotates the at least two permanent magnets are at the same angular displacement from the fixed coil and soft ferromagnetic core;
  the motor system having two defined states of magnetic interaction which are switched in a defined sequence, including a first state that takes place when there is no voltage applied across the electromagnetic coil, and a second state that takes place when a voltage is applied across the electromagnetic coil to produce a current to saturate the ferrite core of the electromagnetic coil, wherein, due to the net magnetization vectors of the soft ferromagnetic core in its saturated magnetization of the second state being lower than the net magnetization vectors of the soft ferromagnetic core in the first state, there is a lower net torque acting on the rotor.

2. The electric motor system of claim 1 wherein the ferrite core is made from material including at least one of Manganese, Zinc and Nickel.

3. The electric motor system of claim 1 wherein reversal of the current to saturate the ferrite core of the electromagnetic coil will not change overall kinetic energy gains per revolution.

4. The electric motor system of claim 1 wherein reversal of the current to saturate the ferrite core of the electromagnetic coil will not change the direction of the angular momentum of the rotor.

5. The electric motor system of claim 1 wherein no EMF is experienced due to the relative motion of the motor's components.

* * * * *